United States Patent [19]
Steinke
[11] Patent Number: 4,774,510
[45] Date of Patent: Sep. 27, 1988

[54] MONITORING ANNUNCIATOR APPARATUS

[75] Inventor: Thomas O. Steinke, River Grove, Ill.
[73] Assignee: ElectroCon, Inc., Deerfield, Ill.

[21] Appl. No.: 861,440
[22] Filed: May 9, 1986
[51] Int. Cl.⁴ ........................ G05B 23/02; G08B 29/00; G08B 25/00
[52] U.S. Cl. ........................ 340/825.17; 340/825.06; 340/825.07; 340/825.16; 340/514; 340/525
[58] Field of Search ........................ 340/825.06, 825.07, 340/825.15, 825.16, 825.17, 870.16, 870.39, 501, 502, 506, 514, 524, 525, 635, 644, 650, 652

[56] References Cited

U.S. PATENT DOCUMENTS

| | | | |
|---|---|---|---|
| 3,110,013 | 11/1963 | Breese | 340/825.15 |
| 3,465,290 | 9/1969 | Mitchell et al. | 340/825.15 |
| 3,638,191 | 1/1972 | Mann | 340/825.17 |
| 3,644,894 | 2/1972 | McCrea | 340/825.17 |
| 3,854,122 | 12/1974 | Cross | 340/825.06 |
| 4,227,180 | 10/1980 | Yasuda et al. | 340/825.17 |
| 4,385,287 | 5/1983 | Eatwell | 340/825.06 |
| 4,668,935 | 5/1987 | McDermott | 340/825.06 |

*Primary Examiner*—Benedict V. Safourek
*Assistant Examiner*—Ralph E. Smith
*Attorney, Agent, or Firm*—Dick and Harris

[57] ABSTRACT

A monitoring annunciator apparatus for monitoring the status of field contact points, which apparatus cooperates with one or more contact points utilizing a single signal wire for each monitored point and a ground wire common to all monitored points, so as to provide separate audible and visual indication, or alternative actuation of a response, upon the occurrence of a change in status of each monitored field contact point and indication of the occurrence of change in the integrity of each wire pair. A microprocessor driven circuit sequentially selects and connects each field contact point to be monitored and tests each field contact point and associated line means at varying voltages the results of which are transformed into a digital logic signal which the microprocessor converts into logic signals to generate audible and visual indication of the status of each of said contact points and associated wire pair on a display or otherwise command that action be taken towards returning said contact points and wire pairs to normal status.

20 Claims, 2 Drawing Sheets

MONITORING ANNUNCIATOR APPARATUS

BACKGROUND OF THE INVENTION

The present invention relates generally to monitoring annunciator devices, and, in particular to a monitoring annunciator apparatus for monitoring the status of field contact points through the use of a single wire pair for each monitored contact point so as to provide separate audible and visual indication of both the occurrence of a change in status of each monitored field contact point and the occurrence of a change in the integrity of each wire pair connecting each contact point to the apparatus.

Over the years, a number of apparata have been addressed to the centralized monitoring of remotely positioned alarm contacts in order to permit a control room operator to visually scan a display panel to assess the status of the monitored alarm points. There have existed apparata which were additionally capable of providing limited monitoring of the wiring which connects the alarm contacts to the central monitoring station. Such line monitoring was typically limited to the detection of an "open circuit" in the line. Unfortunately, however, many of such prior art monitoring devices have experienced drawbacks which may make such devices inappropriate for many alarm installations. The line monitoring functions are typically accomplished through the use of additional supervising wiring which is run in parallel with the wiring connecting the remote contact point to the central station. In large scale monitoring environments it is often necessary to monitor many remote points and often these remote points are great distances from the central monitoring station. Accordingly, the additional wire required to supervise the alarm contact line may prove prohibitedly costly forcing the user to go without the added security which a supervised system provides. Furthermore, in many installations, monitoring of the integrity of the wiring for both the occurrence of "open circuits" as well as "short circuits" is mandatory. Accordingly, prior art devices which can only monitor "open" circuits may prove undesireable.

Additionally, in those prior art systems which did implement line monitoring functions, the occurence of a line alarm condition gave no indication as to the type of fault incurred, often requiring that elaborate manual testing of the line be done to locate and correct the fault without the benefit of knowing what type of fault to look for.

Accordingly, it is an object of the present invention to provide a monitoring annunciator apparatus for monitoring the status of field contact points through the utilization of a single signal wire for each monitored contact point and a ground wire common to all monitored contact points to detect the occurrence of a change in status of each monitored field contact point as well as the occurrence of a change in the integrity of each wire pair.

It is additionally an object of the present invention to provide separate audible and visual indication of both the occurrence of a change in status of each monitored field contact point in the form of a contact alarm and indication of the occurrence of a change in the integrity of each wire pair in the form of a line alarm, for each monitored contact point.

It is yet a further object of the present invention to provide such a monitoring annunciator apparatus which may be utilized in environments where a field contact point to be monitored is a great distance from the monitoring annunciator apparatus.

Another object of the invention is to provide for the monitoring of the wiring connecting each field contact point to the monitoring annunciator apparatus for both the occurrence of a "open" circuit and a "short" circuit in an environment in which one wire of the pair is the coimmon ground, with resultant material and labor savings resulting from elimination of respective separate ground wiring.

Yet another object of the present invention is to provide a display panel which will indicate the occurrence of an alarm condition as well as an alarm condition which has been acknowledged but which remains uncorrected.

It is additionally an object of the present invention to provide a monitoring annunciator apparatus having the capability of identifying which particular wire pair is faulty, and further identifying the nature of the fault as either an "open" or a "short" circuit.

These and other objects of the invention will become apparent in light of the present specification and drawings.

SUMMARY OF THE INVENTION

The present invention comprises a monitoring annunciator apparatus for monitoring the status of remotely positioned field contact points as well as the wiring which links each of the field contact points to the annunciator apparatus. The apparatus cooperates with one or more remotely installed contact points utilizing a single signal wire for each monitored contact point and a ground wire common to all monitored contact points to provide notification through separate audible and visual indication of both the occurrence of a change in the status of each monitored filed contact point, through the issuance ofa contact alarm, and an indication of the occurrence of a change in the integrity of each wire pair, through the issuance of a line alarm, and implementation of corrective measures to return the field contact points and associated wire pair to normal status. The field contact points consist of customer supplied dry contacts which may be of either the normally open or normally closed variety, such as may be found in a fire alarm, pressure transducer or similar device, and whose status needs to be monitored at a central location remote to the alarm point itself. The monitoring annunciator apparatus itself comprises line terminator means operably and electrically connected to each of the remotely placed field contact points. Each line terminator means has a first end and a second end where the first end is operably and electrically connected to the field contact point.

Line means associated with each respective field contact point are provided in which the line means has a first end and a second end where the first end is operably and electrically connected to the second end of each associated line terminator means and thereby its respective field contact point. The line means serves to link the field contact point to the monitoring annunciator apparatus. The present invention permits the use of a line means associated with each respective field contact wherein each line means comprises a single ground wire which is common to all monitored field contact points. The line means further includes a signal wire unique to each of the monitored field points.

Switch means, associated with each respective field contact point, having a first end and a second end where the first end is operably and electrically connected respectively to each second end of the signal line of each of the lines means selectably electrically connects the desired field contact point, its associated respective line terminator means and line means to the monitoring annunciator apparatus. Switch select means, operably and electrically connected to the switch means, enables a desired switch means to, in turn, connect the particular field contact point, its associated line terminator means and line means to the monitoring annunciator apparatus.

Sensor power means operably and electrically connected to the second end of the switch means are provided for supplying selectable voltages via the line means to respective ones of the field contact points and associated line terminator means to, in turn, enable the monitoring annunciator apparatus to determine the status of the selected field contact point and the integrity of the associated line means which connects that field contact point to the apparatus. Test means operably and electrically connected to the second end of the switch means serves to generate and transmit a digital logic signal in response to the application of voltages generated by the sensor power means to the field contact point and associated line terminator means, via the line means.

Line monitor processor means are provided for operable and electrical connection to the switch select means, sensor power means and test means. The line processor means provides logic signals to the switch select means to select and thereby connect the desired field contact point and associated line terminator means and line means to the monitoring annunciator apparatus. The line processor means further provides logic signals to the sensor power means to sequentially select predetermined voltages to be applied to the contact points and associated line terminator means. The line monitor processor means additionally receives digital logic signals from the test means, to, in turn, permit the determination of the occurrence of change of status of the field contact point and determine the occurrence of the change of status of the line means integrity providing logic signals in response to the status of the field contact point and line means. Information processor means operably and electrically connected to line processor means are provided for transmitting information to further actuate said notification and corrective devices in response to the logic signals received from the logic line monitor processor means. Information reception means operably and electrically connected to the information processor means receive and otherwise react to the status of each of the monitored field contact points and the condition of each corresponding line means connecting the annunciator apparatus to each of the field contact points.

In the preferred embodiment, each line terminator means includes a first terminal and a second terminal operably and electrically attached to the signal line and common line, respectively, of the contact side of the line terminator means; and a third terminal and a fourth terminal operably and electrically attached to the signal line and the common line, respectively, of the input side of the line terminator means. A first resistor and a first diode are operably and electrically connected in series to the first terminal and the second terminal to thereby form a first leg. A second resistor and a second diode are operably and electrically connected in series to the third terminal and the fourth terminal are connected in series to thereby form a second leg. The first leg and the second leg are connected in parallel with one another whereby the occurrence of a change in the status of the respective contact point attached between the first and second terminals, and the occurrence of a change in the integrity of the respective line means attached to the third and fourth terminals may be detected by the monitoring annunciator apparatus as a function of the voltage level measured by the test means. Preferably, the pair of wires forming each of the line means are fabricated of 16 gauge wire though virtually any gauge wire may be used. The invention as disclosed herein, is capable of operating with impedances up to 1000 ohms per monitored contact point. Accordingly, with 16 gauge wire having an impedance of 5 ohms per 1000 feet, the present invention can function in situations where any remote field contact point is positioned as much as 100,000 feet from the monitoring annunciator apparatus. In the preferred embodiment of the invention the monitoring annunciator apparatus includes line conditioning means which are operably and electrically connected respectively to the signal line of each of the line means for isolating the monitoring annunciator apparatus from electrical power surge interference of the type which would typically be encountered in an industrial installation. The line conditioning means preferably consists of a 10 ohm resistor connected in series between each of the second ends of the signal line of each line means and the first ends of the switch means. Additional line conditioning is achieved through a metal oxide veristor operably and electrically connected between each of the first ends of the switch means and a common ground.

In the preferred embodiment, the switch means comprises a plurality of addressable analog switch modules each having an input, an output and a plurality of address lines where a single switch within each of the modules may be enabled, and alternatively disabled, by the input of a predetermined address code generated by the line monitor processor means and transmitted to the address lines of the switch modules. The switch select means comprises a multiplexer having an input and an output where a specific address code generated by the line monitor processor means causes the desired switch module to be enabled to the exclusion of the others to, in turn, cause the single desired contact point and associated line terminator means and line means to be connected to the monitoring annunciator apparatus.

In the above-described preferred embodiment of the invention the monitoring annunciator apparatus includes, filter means having a first end and a second end where the first end is operably and electrically connected to the second end of the switch means for providing a stable noise-free signal to the monitoring annunciator apparatus to thus isolate the annunciator apparatus from undesireable electrical and magnetic interference such as AC transient signals which could otherwise interfer with the operation of the invention. The filter means is preferably an active low-pass filter configured to have a 20 hertz cutoff thus serving to provide AC transient protection by removing electrical and magnetic induced interference though a low pass filter having as low as a 10 hertz cutoff or as high as a 40 hertz cutoff would be suitable. The sensor power means preferably comprises a voltage source capable of selectably providing a positive 5 volt, a negative 5 volt and 0 volt output in response to the digital logic signals received from the line monitor processor means. The test means preferably comprise a plurality of comparitors each of which upon detecting an applied voltage within a predetermined range produces a digital logic signal output which indicates the presence or absence of the associated predetermined voltage. A National Semiconductor Corporation model LM2901 integrated circuit quad comparitor is suitable. In the preferred embodiment, the line monitor processor means comprises a self-contained microprocessor and memory assembly, such as a 68705 microprocessor assembly manufactured by Motorola. This processor chip contains Read-Only-Memory and Random-Access-Memory capabilities.

In operation, three "tests", under control of the computer program stored in ROM are executed by the microprocessor whereby a positive 5 volt and negative 5 volt and a 0 volt "test" is generated in sequence by the sensor power means and applied to each sequentially selected field contact point and associated line termination means. For each corresponding voltage sensed by the test means, a three bit digital logic signal is generated by the test means, the results of the three "tests" being stored in RAM. The three bit logic signal is generated on lines 200, 201 and 202 by the three comparitors 81, 82 and 83, as shown in FIG. 4 according to the following table:

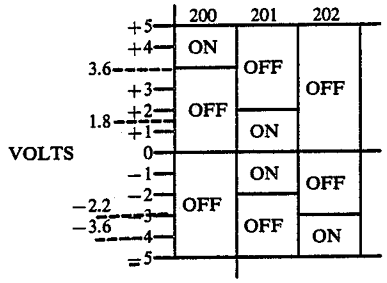

The computer program performs an analysis of the three test results stored in RAM and determines the status of the field contact point as open or closed, and the status of the line means as "normal", "open" or "shorted" in accordance with the following truth table.

| | INPUTS | | OUTPUTS | | |
|---|---|---|---|---|---|
| LINE CONDITION | 31 | 32 | 202 | 201 | 200 |
| LINE OPEN | 0 | 0 | 0 | 0 | 1 |
| | 1 | 0 | 1 | 0 | 0 |
| | 0 | 1 | 0 | 0 | 1 |
| LINE SHORTED | 0 | 0 | 0 | 1 | 0 |
| | 1 | 0 | 0 | 1 | 0 |
| | 0 | 1 | 0 | 1 | 0 |
| CONTACT OPEN | 0 | 0 | 0 | 1 | 0 |
| | 1 | 0 | 1 | 0 | 0 |
| | 0 | 1 | 0 | 0 | 0 |
| CONTACT CLOSED | 0 | 0 | 0 | 1 | 0 |
| | 1 | 0 | 0 | 0 | 0 |
| | 0 | 1 | 0 | 0 | 0 |

The line monitor processor means under command of the computer program then generates logic signals which are received by the information processor means which, in turn, transmits information to further actuate said information reception means, to either audibly or visually display the "occurrence", or otherwise actuate mechanisms to respond to and/or correct the "occurrence" being monitored.

In the preferred embodiment of the invention, the information reception means comprises a display panel which includes an alarm horn and a red lamp, a yellow lamp, a green lamp and a legend plate for each of the monitored field contact points. The lamps are illuminated in response to command signals received from the display processor means according to the following scheme. The flashing illumination of the red lamp and sounding of the alarm horn signifies an alarm condition indicating a change in the status of the field contact point identified by the associated legend plate bearing indicia describing and identifying that field contact point. The constant illumination of the red lamp and silencing of the alarm horn indicates that the alarm condition has been acknowledged but remains uncorrected. Similarly, flashing illumination of the yellow lamp and sounding of the alarm horn signifies a line alarm condition indicating a change in the integrity of one or more of the line means while the constant illumination of the yellow lamp and silencing of the alarm horn similarly indicates that the line alarm condition has been acknowledged but remains uncorrected. Alternatively, the illumination of the green lamp signifies a normal condition indicating that no change in the status of the field contact point nor breach of line means integrity has occurred. Preferably, the display means further includes a digital display, a first LED and a second LED. The digital display is activated upon the occurrence of a line alarm condition and provides an identification of which of the line means associated with the field contact point has been detected by the line monitor processor means as experiencing the line alarm condition. This identification thus permits the individual identification of field contact points and associated line means and corresponding diagnosis as an "open" or "short" circuit in the event that multiple alarm conditions occur. The first LED is illuminated upon the occurrence of a line alarm condition to further identify the alarm condition where it results from an "open circuit" in the line means identified on the digital display. Alternatively, the second LED is illuminated upon the occurrence of a line alarm condition to identify the line alarm condition where it results from a "short circuit" in the line means identified on the digital display. Acknowledging either an alarm condition or line alarm condition is accomplished by depressing the flashing lamp which thereby signals the acknowledgement and silences the alarm horn and causing the respective lamp to glow steadily.

In an alternative embodiment of the invention, the red lamp, yellow lamp and green lamp are placed behind translucent legend plates corresponding to each field contact point such that the indicia appearing on the legend plate will glow in color indicating the status of the field contact point and associated line means. Acknowledgement of an alarm condition or a line alarm condition is accomplished through depressing the legend plate itself.

In an alternative embodiment of the invention, the information reception means comprises a communication device (not shown) which is capable of transmitting a pre-recorded message over a telephone line to, for example, notify the proper authorities in that the event the monitoring annunciator apparatus detects a change in a fire sensor's field contact point thus signalling the presence of a fire or similar safety or security affecting event. Alternatively, the communication device may be configured so as to implement corrective measures by, for example, actuating a sprinkler system to extinguish a fire detected by the monitoring annunciator apparatus.

In the preferred embodiment of the invention the monitoring annunciator apparatus includes a back-up power supply consisting of rechargeable batteries which provide electrical power to the apparatus in the event of a power failure to thereby permit continued operation of the monitoring annunciator apparatus.

DETAILED DESCRIPTION OF THE DRAWINGS

Figure 2:
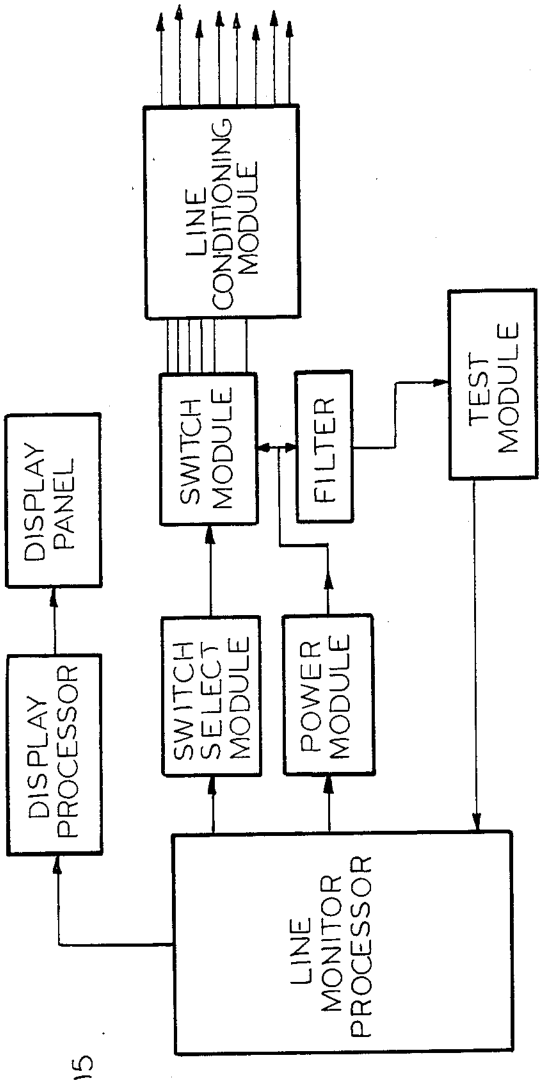
FIG. 2 of the drawings is a block diagram illustrating the functional modules comprising the present invention.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiment illustrated.

Figure 1:
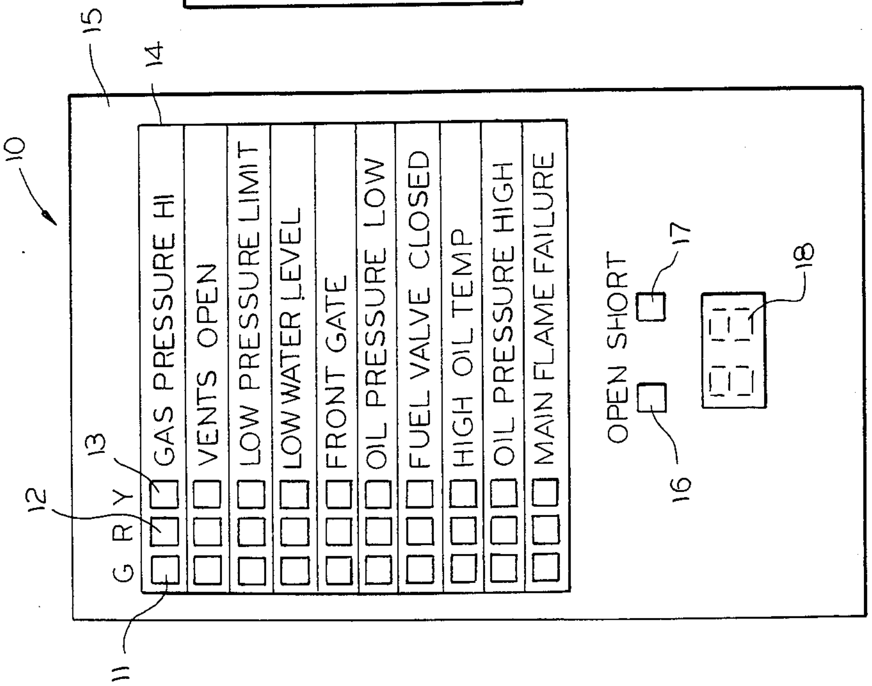
FIG. 1 of the drawings is a front elevational view of the display means illustrating the green, red and yellow lamps and legend plate associated with each monitored field contact point as well as digital display and first and second LEDs.

Display means 15 of monitoring annunciator apparatus 10 is shown in FIG. 1, in which the circuitry depicted by the block diagram of FIG. 2 is contained. Green lamp 11, red lamp 12 and yellow lamp 13 are shown positioned proximate to legend plate 14 which each bear indicia identifying the particular field contact point 28 shown in FIG. 3. As shown, individual green, red and yellow lamps are provided for each legend plate, and corresponding field contact point, such that multiple alarm conditions may be observed upon viewing display means 15. Positioned behind each red lamp 12 and yellow lamp 13 are switches (not shown) which are operated upon depressing lamps 12 and 13 which serves to acknowledge the respective alarm condition. Also shown is digital display 18, LED 16 and LED 17 each of which is activated only in the event that a line alarm condition occurs as signified by the illumination of yellow lamp 13. Upon the occurrence of a line alarm condition, digital display 18 will provide numerical identification of the particular field contact point 28 whose associated line means is diagnosed by the line monitor processor means as being faulty. LED 16 will illuminate in the event that the fault in the line means associated with the contact point displayed on digital display 18 is detected as resulting from the occurrence of an "open circuit." Alternatively, LED 17 will illuminate to signify that the fault in the line means associated with the contact point displayed in digital display 18 is detected as resulting from a "short" in that portion of the circuit. In the event that multiple line alarm conditions occur, digital display 18 will alternatively display the identifying numerial for each of the affected field contact points wherein the appropriate LED 16 or LED 17 will be illuminated for each of the multiple contact points alternatively displayed.

FIG. 2 illustrates a block diagram of the logic flow of the present invention. The line monitor processor generates and transmits logic signals to the switch select module which activates a single switch within the switch module which, in turn, causes a single field contact point to be electrically connected to the monitoring annunciator apparatus through the line conditioning module. The line monitor processor generates and transmits logic signals to the power module which in turn sequentially outputs voltages through the switch module to the particular field contact point, via the enabled switch. The voltages sensed by the test module, which are a function of the status of the selected field contact point and associated line means, pass through the filter to remove unwanted electrically and magnetically induced interference. The test module, in response to the voltages applied by the power module and sensed by the test module, generates and transmits a digital logic signal to the line monitor processor. The line monitor processor upon receipt of the digital logic signals from the test module generates and transmits additional logic signals to the display processor which in turn actuates the display panel.

Figure 3:
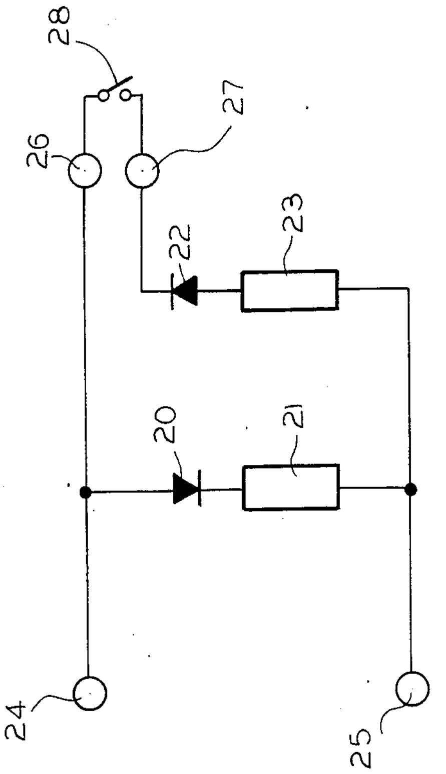
FIG. 3 is a circuit diagram of the line terminator means.

In FIG. 3 line terminator means is shown comprising first terminal 26, second terminal 27, third terminal 24 and fourth terminal 25. First terminal 26, field contact point 28, second terminal 27, diode 22 and resistor 23 are shown connected in series to form a first leg. Third terminal 24, diode 20, resistor 21 and fourth terminal 25 are similarly shown connected in series to form a second leg. The first leg and second leg are thus shown connected in parallel. Terminals 24, 25, 26, and 27 are preferably composed of compression type field terminal strips. The line means (not shown) associated with field contact point 28 includes a signal line and a common line where the signal line is attached to terminal 24 and the common line is attached to terminal 25. The line means serves to connect each respective field contact point, such as field contact point 28 to the monitoring annunciator apparatus 10. Resistors 21 and 23 are preferably 2.2K ohm resistors and diodes 20 and 22 are preferably IN4003 type diodes.

Figure 4:
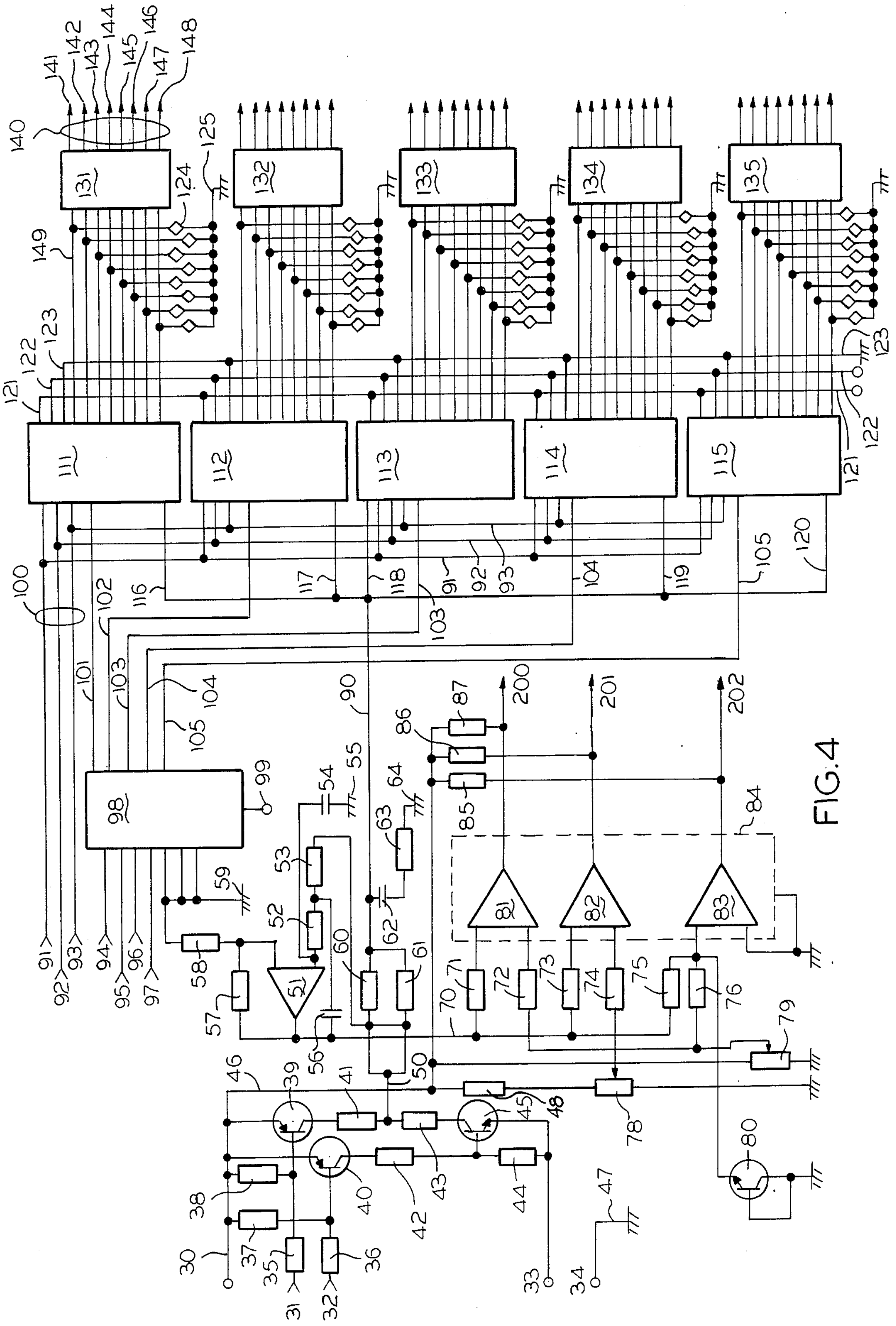
FIG. 4 is a circuit diagram of the present invention as illustrated in FIG. 2 excluding the line monitor processor, display processor and display panel.

The circuit elements which comprise the line conditioning means, switch means, switch select means, filter means, sensor means and the test means of the present invention are illustrated in FIG. 4. The circuitry for the line monitor processor, display processor and display panel illustrated in block form in FIG. 2 are omitted from this figure as their precise configuration is deemed nonessential to the understanding of the present invention. The circuitry in FIG. 4 corresponds to a monitoring annunciator apparatus which is capable of monitoring 40 separate and distinct field contact points. The 40 monitored field contact points are handled in groups of 8 and are thus shown connected to the 5 separate line conditioning modules designated 131 through 135. As each of the monitored field contact points utilizes a single common line, only the signal line of each of the line means associated with each field contact point need be selected by the monitor annunciator apparatus to access a desired field contact point. A group of 8 signal lines 140 consisting of signal lines 141 through 148 are shown connected to the line conditioning means 131. Line conditioning means 131 comprises an 8 resistor dip style array. Line conditioning means 132, 133, 134 and 135 accept the remaining four groups of 8 signal lines each. The line conditioning means is shown further including a metal oxide veristor 124 connected between each of the signal lines associated with a respective field contact point, as illustrated by line 149.

Signal line 149 is shown connected to switch means 111. The switch means comprise five addressable analog switch modules corresponding to the five groups of 8 signal lines, designated 111 through 115 such as a type CD4051 8 to 1 multiplexer manufactured by RCA Corporation. Emanating from each of the switch means 111 through 115 are power supply lines 121, 122 and 123 wherein lines 121 and line 122 carry a positive voltage and a negative voltage respectively, and where line 123 is grounded. The output of each of the switch means is shown connected to its associated line conditioning assembly. Associated with each switch means 111 through 115 are shown address lines 100 which consist of a three-bit address carried on lines 91, 92 and 93, as well as switch enable lines 101 through 105 respectively. Switch select means preferably includes integrated circuit 98 which comprises a type 74C154 1 of 16 decoder which serves to decode the four-bit input on lines 94 through 97 and output digital logic signals on line 101 through 105. In operation, the portion of the address presented by the line monitor processor on lines 91, 92 and 93 selects one switch in each switch module 111 through 115. The remaining portion of the address presented by the line monitor processor on lines 94 through 97 is decoded by switch select means 98 and in turn serves to enable one of the switch means 111 through 115 to the exclusion of the others to thereby connect a single field contact point to the monitoring annunciator apparatus. Line 99 is shown suppling power to integrated circuit 98.

The filter means is shown comprising integrated circuit 51 equivalent to a LM2904 op amp manufactured by National Semiconductor Corporation. Resistor 52, a 11K ohm resistor, is shown connected in series with a 5600 ohm resistor 53 and attached to one input of op amp 51. A one microfarad capacitor is shown connected between op amp 51 and ground. Between resistor 52 and resistor 53 is shown a one microfarad capacitor 56 connected to the output of op amp 51 designated by line 70. A 33K ohm resistor 57 is shown connected between the other input of op amp 51 and its output on line 70. Resistor 58 is similarly a 33K ohm resistor which is connected to op amp 51 and switch select means 98.

The low pass filter further includes resistors 60 and 61, each of which are 47K ohm resistors, shown connected in parallel with one another and further connected to resistor 53. Line 90 designates the input line to the filter means. Capacitor 62 which is a one microfarad capacitor and resistor 63, a 220 ohm resistor are connected between line 90 and ground. Line 90, the input to the filter means is shown connected to lines 116, 117, 118, 119 and 120 which are in turn connected to switch means 111 through 115 respectively. In operation, signal line 149 is conducted through switch means 111 by line 116 and is presented to line 90 which then connects with the filter means whose output appears on line 70.

The sensor power means are shown comprising a positive five volt line 30, a negative five volt line 33, a terminal 34 connected to ground 47 and two inputs, 31 and 32, for accepting logic signals from the line processor means. The selectable positive five volt, negative five volt or 0 volt output of the source power means appears on line 50 which is in turn connected to line 90. Connected between line 30 and each of the digital input lines 31 and 32 are 1K ohm resistors, 37 and 38. Connected between resistors 37 and 38 and lines 32 and 31 are shown 4.7K ohm resistors 36 and 35, respectively. Transistors 39 and 40 are 2N3906 type transistors. Transistor 39 is shown having its base terminal connected to line 31, its emitter terminal connected to positive five volt line 30 and its collecter terminal attached to a 1K ohm resistor 41. Transistor 40 is shown having its base terminal connected to line 32, its emitter terminal connected to positive five volt line 30 and its collecter terminal connected to 4.7K ohm resistor 42. A type 2N3904 transistor 45 is shown having its base terminal connected to resistor 42 and 1K ohm resistor 44. The emitter terminal of transistor 45 is shown connected to resistor 44 which are each connected to negative five volt line 33. The collecter terminal of transistor 45 is shown connected to 1K ohm resistor 43 which is connected to the output of sensor power means on line 50.

The test means are shown comprised of a type LM2901 quad comparitor 84 manufactured by National Semiconductor. Comparitors 81, 82 and 83 are utilized to provide a digital output on lines 200, 201 and 202 which are in turn connected to the line monitor processor means (not shown). The inputs to comparitor 81 are shown connected to 4.7K ohm resistors 71 and 72. The input to comparitor 82 is shown connected to 4.7K ohm resistor 73 and 47 K ohm resistor 74. One of the inputs of comparitor 83 is shown connected to ground while the other is shown connected to 4.7 K ohm resistors 75 and 76.

The output of the filter means, appearing on line 70, is shown connected to resistors 71, 73, and 75. Resistor 72 of comparitor 81 is connected to a 2K potentiometer which is in turn connected to positive five volt line 46 and ground. Potentiometer 79 thus serves to provide an adjustable reference voltage for comparitor 81. Resistor 74 of comparitor 82 is shown connected to 2K potentiometer 78 which is in turn connected to resistor 48 which is connected to five volt line 46. Potentiometer 78 serves to provide an adjustable reference voltage for comparitor 82. Resistor 76 of comparitor 83 is shown connected to potentiometer 79 and resistor 72. The associated input of comparitor 83 is further shown connected to the collecter terminal of transistor 80 whose base and emitter terminals are connected to ground. The outputs of comparitors 81, 82 and 83 which appear on lines 200, 201 and 202 are shown connected to 3.3K ohm resistors 87, 86 and 85, respectively, which are in turn connected to five volt line 46.

Address signals 91 through 97, sensor power means signals 31 and 32 and test means output signals 200, 201 and 202 are each operably and electrically connected to the line processor means (not shown in FIG. 4).

In operation, the line monitor processor provides address signals on lines 91 through 97 which serve to select a single signal line and associated field contact point. Lines 31 and 32 of the sensor power means receive digital inputs from the line monitor processor means to, in turn, output a positive five volt, a negative five volt, and a 0 volt output on line 50 which is connected to line 90 and in turn to the signal line of the selected field contact point. Line 90 is further connected through the filter means whose output appears on line 70. Line 70 thus connects to the test means whose outputs on lines 200, 201, and 202 are connected to the line monitor processor means, as shown in FIG. 2.

The foregoing description of the drawings merely explain and illustrate the invention and the invention is not limited thereto, except is so far as the amended claims are so limited as those skilled in the art who have the disclosure before them will be able to make modifications and variations therein without departing from the scope of the invention.

What is claimed is:

1. A monitoring annunciator apparatus for monitoring the status of field contact points, which apparatus cooperates with one or more contact points utilizing a single wire for each monitored contact point and a wire common to all monitored contact points so as to detect the occurrence of a change in status of each monitored field contact point and the occurrence of a change in the integrity of each wire pair to provide notification towards implementation of corrective measures in response thereto, said monitoring annunciator apparatus comprising:

two or more line terminator means, at least two of said two or more line terminator means are each operably and electrically connected to respective ones of said field contact points, each of said at least two line terminator means having a first end and a second end, with said first end being operably and electrically connected to said respective field contact point;

at least two dedicated signal wire means, each operably and electrically associated with a respective one of said at least two line terminator means, each of said at least two dedicated signal wire means having a first end and a second end with said first end of said respective dedicated signal wire means being operably and electrically connected to said second end of said respective one of said at least two line terminator means;

common ground wire means operably and electrically connected to said at least two line terminator means, said common ground wire means having a first end and a second end with said first end of said common ground wire means being operably and electrically connected to said second ends of said at least two line terminator means;

switch means associated with said respective ones of said field contact points, said switch means having a first end and a second end where said first end is operably and electrically connected respectively to each second end of said dedicated signal wire means, for selectively electrically connecting a desired one of said respective ones of said field contact points, and associated ones of said respective line terminator means to said monitoring annunciator apparatus;

switch select means operably and electrically connected to said switch means for enabling a desired switch means to, in turn, connect a particular field contact point and associated respective line terminator means to said monitoring annunciator apparatus;

sensor power means operably and electrically connected to said second end of said switch means for supplying selectable voltages via said respective dedicated signal wire means and common ground wire means to respective ones of said field contact points and associated line terminator means to, in turn, enable said monitoring annunciator apparatus to determine the status of said selected field contact point and the integrity of said associated dedicated signal wire means and common ground wire means;

test means operably and electrically connected to said second end of said switch means, said test means serving to generate a digital logic signal in response to the application of voltages generated by said sensor power means to said respective field contact point and associated line terminator means, via said respective dedicated signal wire means and common ground wire means;

line monitor processor means operably and electrically connected to said switch select means, said sensor power means and test means; said line monitor processor means providing logic signals to said switch select means to select, and thereby connect a desired field contact point and associated line terminator means and respective dedicated signal wire means and common ground wire means to said monitoring annunciator apparatus; said line processor means further providing logic signals to said sensor power means to sequentially select said predetermined voltages to be applied to said field contact points and associated line terminator means; said line monitor processor means further receiving digital logic signals from said test means to, in turn, permit the determination of the occurrence of a change of status and integrity of said field contact point and said respective dedicated signal wire means and common ground wire means in response to the status of said field contact point and respective dedicated signal wire means and common ground wire means logic signals;

information processor means operably and electrically connected to said line monitor processor means for transmitting information to alternatively provide notification and implement corrective measures devices in response to said logic signals received from said line monitor processor means;

information reception means operably and electrically connected to said information processor means for receiving and otherwise reacting to the status of each of said monitored field contact points and the condition of each corresponding respective dedicated signal wire means and common ground wire means connecting said annunciator apparatus to said field contact points so as to alternatively provide said notification of and implement corrective actions to said annunciator apparatus; whereby a change in the status of each respective field contact point and a change in the integrity of each respective associated dedicated signal wire means and common ground wire means is detected by said test means as a function of the application of voltages generated by said sensor power means as applied to the selected connection of each field contact point and associated line terminator means.

2. The monitoring annunciator means according to claim 1 in which said invention further comprises line conditioning means operably and electrically connected respectively to the dedicated signal wire means for isolating said monitoring annunciator apparatus from electrical power surge interference.

3. The invention according to claim 2 in which said line conditioning means comprises a resistor connected between the respective second ends of said dedicated signal wire means and first ends of said switch means.

4. The invention according to claim 3 in which said line conditioning means further comprises a metal oxide veristor operably and electrically connected between each of said first ends of said switch means and a common ground.

5. The monitoring annunciator apparatus according to claim 1 in which said inventon further comprises filter means operably and electrically interposed between the second end of said switch means and said test means, for providing a stable noise-free signal to said monitoring annunciator apparatus and isolating said apparatus from undesirable electrical and magnetic interference.

6. The invention according to claim 5 in which said filter means comprises an active low pass filter having a twenty Hz cut off, said low pass filter serving to provide AC transient protection by removing electrically and magnetically induced interference which would otherwise be transmitted by said respective dedicated signal wire means to said monitoring annunciator apparatus to, in turn, preclude the rendering of said monitoring annunciator apparatus inoperative.

7. The invention according to claim 1 in which each of said at least two of said two or more line terminator means includes;

- a first terminal and second terminal operably and electrically attached to said dedicated signal wire means and said common ground wire means, respectively, of said first end of said line terminator means,
- a third terminal and a fourth terminal operably and electrically attached to said dedicated signal wire means and said common ground wire means, respectively, of said second end of said line terminator means;
- said first terminal, a first resistor and a first diode and said second terminal operably and electrically connected in series to thereby form a first circuit portion;
- said third terminal, a second resistor and a second diode and said forth terminal operably and electrically connected in series to thereby form a second circuit portion;
- said first circuit portion and said second circuit portion being connected in parallel whereby the occurrence of a change in the status of said respective contact point attached between said first and second terminals and occurrence of change in the integrity of said respective dedicated signal wire means and common ground wire means attached to said third and fourth terminals may be detected by said monitoring annunciator apparatus.

8. The invention according to claim 1 in which said dedicated signal wire means and common ground wire means are fabricated of 16 gauge wire.

9. The invention according to claim 1 in which said switch means comprises a plurality of addressable analog switch modules each having an input side, an output side and plurality of address lines, where a single switch within each of said modules may be enabled, and alternatively disabled, by the input of a predetermined address code generated by said line monitor processor means to said address lines of said switch modules.

10. The invention according to claim 9 in which said switch select means further comprises a multiplexer having an input side and an output side where a specific address code generated by said line monitor processing means is provided to said multiplexer to thereby cause a desired switch module to be enabled to, in turn, cause a single desired contact point, associated line terminator means and respective dedicated signal wire means and common ground wire means to be selected for testing.

11. The invention according to claim 1 in which said sensor power means comprises a voltage source capable of selectably and alternatively providing a positive five volt, a negative five volt and a zero volt output in response to digital logic signals received from said line monitor processor means.

12. The invention according to claim 1 in which said test means comprises a plurality of comparitors each of which produces a digital logic signal output upon detecting an applied voltage to, in turn, indicate the presence or absence of an associated predetermined voltage.

13. The invention according to claim 1 in which said line monitor processor means comprises a self contained microprocessor and memory assembly for generating logic signals in response to an internally stored computer program and for accepting digital logic input from said test means towards producing logic signals under command of said computer program, to thereby signal said information processor means.

14. The invention according to claim 13 in which said information processor means comprises a display processor and memory assembly which, upon receipt of said logic signals, causes said information reception means to notify the status of each of said field contact points and the status of each of said respective dedicated signal wire means and common ground wire means.

15. The invention according to claim 14 in which said information reception means comprises a display panel for providing separate audible and visual indication of the status of each monitored field contact point and respective dedicated signal wire means and common ground wire means.

16. The invention according to claim 15 in which said display panel comprises an alarm horn and a red lamp, a yellow lamp, a green lamp and a legend plate for each monitored field contact point where said lamps are illuminated in response to command signals received from said display processor means,

- where said legend plate bears indicia identifying said field contact point,
- where the flashing illumination of said red lamp and sounding of said alarm horn signifies an alarm condition indicating a change in the status of said field contact point,
- where the constant illumination of said red lamp and silencing of said alarm horn indicates that said alarm condition has been acknowledged but remains uncorrected,
- where the flashing illumination of said yellow lamp and sounding of said alarm horn signifies a line alarm condition indicating a change in the integrity of one or more of said respective dedicated signal wire means and common ground wire means,
- where the constant illumination of said yellow lamp and silencing of said alarm horn indicates that said line alarm condition has been acknowledged but remains uncorrected, and
- where the illumination of said green lamp signifies a normal condition indicating that no change in the status of said field contact point has occurred.

17. The invention according to claim 16 in which said red lamp, said yellow lamp and said green lamp are placed behind a translucent legend plate corresponding to each field contact point such that the indicia appearing on said legend plate will glow in color indicating the status of said field contact point and associated dedicated signal wire means and common ground wire means.

18. The invention according to claim 15 in which said display panel further comprises a digital display, a first LED, and a second LED, said digital display being activated upon the occurrence of a line alarm condition to provide an identification of which of said dedicated signal wire means and common ground wire means associated with said field contact point is detected by said line monitor processor means as experiencing said line alarm condition to thus permit the individual identification of field contact points and associated dedicated signal wire means and common ground wire means in the event that multiple alarm conditions occur;

said first LED being illuminated upon the occurrence of a line alarm condition to further identify said alarm condition as resulting from an open circuit in said respective dedicated signal wire means and common ground wire means identified on said digital display;

said second LED being illuminated upon the occurrence of a line alarm condition to further identify said line alarm condition as resulting from a short circuit in said respective dedicated signal wire means and common ground wire means identified on said digital display.

19. The invention according to claim 1 in which said information reception means comprises a communication device capable of generating additional signals to actuate remote notification of the change in status and integrity of the monitored contact points and dedicated signal wire means and common ground wire means to, in turn, actuate implementation of corrective measures to return the status of said monitored contact points to a normal condition.

20. The invention according to claim 1 in which said monitoring annunciator apparatus further includes back-up power supply means comprising rechargable batteries for providing electrical power in the event of a failure of said sensor power means to thus permit continued operation of said monitoring annunciator apparatus.

* * * * *